(12) United States Patent
Panchenko et al.

(10) Patent No.: US 8,478,948 B2
(45) Date of Patent: Jul. 2, 2013

(54) METHOD AND SYSTEM FOR EFFICIENT TRACING AND PROFILING OF MEMORY ACCESSES DURING PROGRAM EXECUTION

(75) Inventors: Maksim V. Panchenko, Mountain View, CA (US); Chandrashekhar R. Garud, Newark, CA (US); Fu-Hwa Wang, Saratoga, CA (US)

(73) Assignee: Oracle America, Inc., Redwood City, CA (US)

( * ) Notice: Subject to any disclaimer, the term of this patent is extended or adjusted under 35 U.S.C. 154(b) by 551 days.

(21) Appl. No.: 12/328,364

(22) Filed: Dec. 4, 2008

(65) Prior Publication Data

US 2010/0146220 A1 Jun. 10, 2010

(51) Int. Cl.
*G06F 12/00* (2006.01)
(52) U.S. Cl.
USPC ............. 711/154; 714/25; 717/124; 717/130
(58) Field of Classification Search
USPC ....................... 711/154; 714/25; 717/124, 130
See application file for complete search history.

(56) References Cited

U.S. PATENT DOCUMENTS

| | | | |
|---|---|---|---|
| 3,704,363 A | 11/1972 | Salmassy et al. | |
| 4,969,164 A | 11/1990 | Mehta et al. | |
| 5,046,068 A | 9/1991 | Kubo et al. | |
| 5,257,215 A | 10/1993 | Poon | |
| 5,339,266 A | 8/1994 | Hinds et al. | |
| 5,386,375 A | 1/1995 | Smith | |
| 5,515,308 A | 5/1996 | Karp et al. | |
| 5,546,593 A | 8/1996 | Kimura et al. | |
| 5,619,439 A | 4/1997 | Yu et al. | |
| 5,835,705 A | 11/1998 | Larsen et al. | |
| 5,950,003 A * | 9/1999 | Kaneshiro et al. | 717/130 |
| 5,953,530 A * | 9/1999 | Rishi et al. | 717/127 |
| 5,954,789 A | 9/1999 | Yu et al. | |
| 6,018,759 A | 1/2000 | Doing et al. | |
| 6,052,708 A | 4/2000 | Flynn et al. | |
| 6,076,157 A | 6/2000 | Borkenhagen et al. | |
| 6,088,788 A | 7/2000 | Borkenhagen et al. | |
| 6,088,800 A | 7/2000 | Jones et al. | |

(Continued)

OTHER PUBLICATIONS

Noah Snavely, Saumya Debray, Gregory Andrews, "Unspeculation," ASE, pp. 205-214, 18th IEEE International Conference on Automated Software Engineering (ASE'03), 2003.*

(Continued)

*Primary Examiner* — Arpan P. Savla
(74) *Attorney, Agent, or Firm* — Rory D. Rankin; Meyertons, Hood, Kivlin, Kowert & Goetzel, P.C.

(57) ABSTRACT

A system and method for performing efficient program instrumentation for memory profiling. A computing system comprises a memory profiler comprising a static binary instrumentation (SBI) tool and a dynamic binary analysis (DBA) tool. The profiler is configured to selectively instrument memory access operations of a software application. Instrumentation may be bypassed completely for an instruction if the instruction satisfies some predetermined conditions. Some sample conditions include the instruction accesses an address within a predetermined read-only area, the instruction accesses an address within a user-specified address range, and/or the instruction is a load instruction accessing a memory location determined from a data flow graph to store an initialized value. An instrumented memory access instruction may have memory checking analysis performed only upon an initial execution of the instruction in response to determining during initial execution that a read data value of the instruction is initialized. Both unnecessary instrumentation and memory checking analysis may be reduced.

20 Claims, 4 Drawing Sheets

U.S. PATENT DOCUMENTS

| | | |
|---|---|---|
| 6,105,127 A | 8/2000 | Kimura et al. |
| 6,131,104 A | 10/2000 | Oberman |
| 6,212,544 B1 | 4/2001 | Borkenhagen et al. |
| 6,282,554 B1 | 8/2001 | Abdallah et al. |
| 6,341,347 B1 | 1/2002 | Joy et al. |
| 6,349,319 B1 | 2/2002 | Shankar et al. |
| 6,357,016 B1 | 3/2002 | Rodgers et al. |
| 6,397,239 B2 | 5/2002 | Oberman et al. |
| 6,415,308 B1 | 7/2002 | Dhablania et al. |
| 6,427,196 B1 | 7/2002 | Adiletta et al. |
| 6,434,699 B1 | 8/2002 | Jones et al. |
| 6,496,925 B1 | 12/2002 | Rodgers et al. |
| 6,507,862 B1 | 1/2003 | Joy et al. |
| 6,523,050 B1 | 2/2003 | Dhablania et al. |
| 6,564,328 B1 | 5/2003 | Grochowski et al. |
| 6,567,839 B1 | 5/2003 | Borkenhagen et al. |
| 6,594,681 B1 | 7/2003 | Prabhu |
| 6,625,654 B1 | 9/2003 | Wolrich et al. |
| 6,629,236 B1 | 9/2003 | Aipperspach et al. |
| 6,629,237 B2 | 9/2003 | Wolrich et al. |
| 6,668,308 B2 | 12/2003 | Barroso et al. |
| 6,668,317 B1 | 12/2003 | Bernstein et al. |
| 6,671,827 B2 | 12/2003 | Guilford et al. |
| 6,681,345 B1 | 1/2004 | Storino et al. |
| 6,687,838 B2 | 2/2004 | Orenstien et al. |
| 6,694,347 B2 | 2/2004 | Joy et al. |
| 6,694,425 B1 | 2/2004 | Eickemeyer |
| 6,697,935 B1 | 2/2004 | Borkenhagen et al. |
| 6,728,845 B2 | 4/2004 | Adiletta et al. |
| 6,748,556 B1 | 6/2004 | Storino et al. |
| 6,801,997 B2 | 10/2004 | Joy et al. |
| 6,820,107 B1 | 11/2004 | Kawai et al. |
| 6,847,985 B1 | 1/2005 | Gupta et al. |
| 6,857,064 B2 | 2/2005 | Smith et al. |
| 6,883,107 B2 | 4/2005 | Rodgers et al. |
| 6,889,319 B1 | 5/2005 | Rodgers et al. |
| 6,898,694 B2 | 5/2005 | Kottapalli et al. |
| 7,051,340 B2 * | 5/2006 | Fisher et al. .............. 719/328 |
| 7,506,318 B1 * | 3/2009 | Lindo et al. .............. 717/130 |
| 7,587,709 B2 * | 9/2009 | Chilimbi et al. .............. 717/130 |
| 7,752,613 B2 * | 7/2010 | Guo et al. .............. 717/153 |
| 8,024,719 B2 * | 9/2011 | Gorton, Jr. .............. 717/158 |
| 2005/0034024 A1 * | 2/2005 | Alverson et al. .............. 714/38 |
| 2008/0155342 A1 * | 6/2008 | O'Callahan .............. 714/38 |

OTHER PUBLICATIONS

Tulsen et al., "Power-sensitive multithreaded architecture," IEEE 2000, pp. 199-206.

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Smith, "The End of Architecture," May 29, 1990, pp. 10-17.

Alverson et al., "Tera Hardware-Software Cooperation," 16 pages.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on a Multithreaded Multiprocessor," ACM 1992, pp. 188-197.

Uhrig, et al., "Implementing Real-Time Scheduling Within a Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over GF(2m)," 11 pages.

* cited by examiner

METHOD AND SYSTEM FOR EFFICIENT TRACING AND PROFILING OF MEMORY ACCESSES DURING PROGRAM EXECUTION

BACKGROUND OF THE INVENTION

1. Field of the Invention

This invention relates to microprocessors, and more particularly, to maintaining and performing efficient program instrumentation for memory profiling.

2. Description of the Relevant Art

Software programmers write applications to perform work according to an algorithm or a method. The program's performance may be increased based on an understanding of the dynamic behavior such as a memory profile of the entire program. Inefficient portions of the program such as memory leaks may be improved once the inefficiencies are known. In addition, understanding a program's dynamic behavior may be useful in computer architecture research, compiler research, or other. Such research may focus on trace generation, branch prediction techniques, cache memory subsystem modeling, fault tolerance studies, or other. Generally speaking, what is needed is a single, compact description of a program's entire control flow including loop iterations and inter-procedural paths.

Accurate instruction traces are needed to determine a program's dynamic behavior by capturing a program's dynamic control flow, not just its aggregate behavior. Programmers, compiler writers, and computer architects can use these traces to improve performance. Without tools to efficiently identify expensive program portions such as memory leaks or errors, it is difficult to improve the performance of software. Further, as processor speeds have increased, it has become more difficult to collect complete execution traces for applications. This is in part due to the sheer number of instructions in such a trace, and also in part due to the performance overhead required to capture these traces.

Many known systems for profiling memory in user applications use instrumentation techniques for monitoring and profiling memory-access patterns. The memory instrumentation comprises detection of memory-related operations (such as load and store operations) and insertion of additional code such as instrumentation code and analysis code that communicates to the profiling system properties of the aforementioned operations such as a corresponding address, a data block size, a program counter value, or other.

One common use for memory profiling is to detect memory-related program errors such as un-initialized memory usage, an array out-of-bounds access, or other. However, instrumentation code brings performance overhead. Straightforward instrumentation of each memory access operation may negatively affect run-time performance of the application. It may be common for a typical memory error detection system to reduce execution time of an application by a factor of 50. For example, a memory profiling system may be used for a server wherein the server requires hours to run the regular server code to test all major code paths. With a straightforward instrumentation, it may take days or even weeks to perform memory profiling.

In view of the above, efficient methods and mechanisms for maintaining efficient program instrumentation for memory profiling is desired.

SUMMARY OF THE INVENTION

Systems and methods for performing efficient program instrumentation for memory profiling are contemplated. In one embodiment, a computing system is provided comprising a static binary instrumentation (SBI) tool coupled to one or more processors of a hardware subsystem and a system memory storing binary code of a software application. Rather than instrument each memory access instruction within the binary code, selective instrumenting and memory checking analysis is performed. Instrumentation may be bypassed completely for an instruction if the instruction satisfies some predetermined conditions. Some sample conditions include the instruction accesses an address within a predetermined read-only area, the instruction accesses an address within a user-specified address range, and/or the instruction is a load instruction accessing a memory location determined from a data flow graph to store an initialized value. In addition, an instrumented memory access instruction may have memory checking analysis performed only upon an initial execution of the instruction in response to determining during initial execution that a read data value of the instruction is initialized. Reduction in unnecessary instrumentation may increase system performance and reduce false positives from memory checking analysis.

In another embodiment, a computer readable storage medium stores program instructions operable to selectively instrument a software application. Instrumentation may be bypassed completely for an instruction if the instruction satisfies some predetermined conditions. An instrumented memory access instruction may have memory checking analysis performed only upon an initial execution of the instruction in response to determining during initial execution that a read data value of the instruction is initialized. Both unnecessary instrumentation and memory checking analysis may be reduced.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Figure 1:
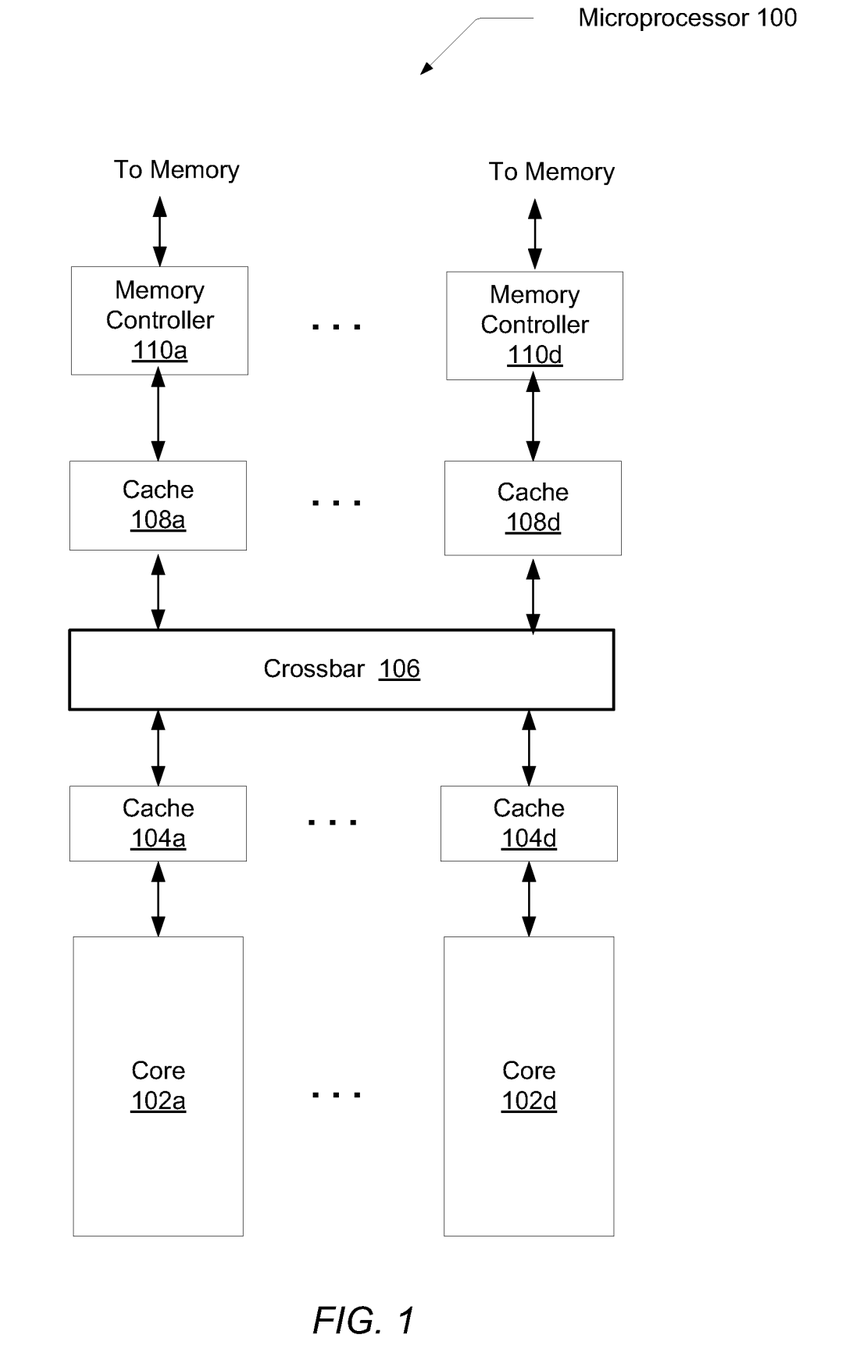
FIG. 1 is a generalized block diagram illustrating one embodiment of a multi-core microprocessor.

Referring to FIG. 1, one embodiment of a multi-core microprocessor 100 is shown. Microprocessor 100 may have multiple cores 102a-102d. As used herein, elements referred to by a reference numeral followed by a letter may be collectively referred to by the numeral alone. For example, cores 102a-102d may be collectively referred to as cores 102. Each core 102 may include a superscalar microarchitecture with one or more multi-stage pipelines. Each core 102 may be configured to execute instructions of software applications corresponding to an instruction set architecture (ISA) such as x86, PowerPC, MIPS, ARM, or other. Also, each core 102 may be designed to execute multiple strands, or threads. For example, a multi-thread software application may have each of its software threads scheduled to be executed on a pipeline within a core 102. Each core 102 may comprise a first-level cache or in other embodiments, the first-level cache 104 may be outside the core 102.

A crossbar 106 may be used to connect each core 102 and first-level cache 104 to shared resources such as second-level caches 108 and lower-level memory via memory controllers 110. Interfaces between crossbar 106 and the different levels of caches 104 and 108 may comprise any suitable technology. In other embodiments, other levels of caches may be present between cache 108 and memory controller 110. Also, an I/O bus adapter, not shown, may be coupled to crossbar 106 to provide an interface for I/O devices to caches 104 and 108 and cores 102. In another embodiment, an I/O interface may be implemented in memory controller 110. Memory controllers 110 may be coupled to lower-level memory, which may include other levels of cache on the die outside the microprocessor, dynamic random access memory (DRAM), dual in-line memory modules (dimms) in order to bank the DRAM, a hard disk, or a combination of these alternatives. Also, in other embodiments, there may only be a single memory controller 110 on microprocessor 100.

A single- or multi-thread software application may be written by a designer to be executed on a single- or multi-core processor, such as the one in FIG. 1, or on a multi-processor chip. The source code may be software applications written by a designer in a high-level language such as C, C++, Fortran, or other. The target code may be machine code or bytecode depending on the type of compilation being performed. Machine code is a general term that refers to patterns of bits with different patterns corresponding to different commands, or instructions, to the machine, or processor. Bytecode is a general term for different forms of instruction sets designed for efficient execution by a software interpreter as well as being suitable for further compilation into machine code. Bytecode may be portable among different computer architectures. The bytecode may then be interpreted, or run, on a virtual machine.

An advantage of splitting the front-end of a compiler from the back-end is front-ends for different languages may be combined with back-ends for different processors. The back-end compiler takes the output from the front-end compiler, or the intermediate code representation, and performs more analysis, transformations, and optimizations for a particular hardware platform. Then it generates machine code for a particular processor and operating system (OS).

An executing application on microprocessor 100 may have time varying behavior. Within a sequence of two or more predetermined time intervals, an application may exhibit a difference in a number of memory accesses performed, a number of instructions executed, or other. The difference may, for example, be due to the application executing code in a different library or due to executing code in different routines of a same library.

A program profile may include program phase changes. However, phases may not be well defined, and may be determined by the user for a particular improvement being studied. As one example, a conditional branch counter may be used to detect program phase changes. The counter may record the number of dynamic conditional branches executed over a fixed execution interval, which may be measured in terms of the dynamic instruction count. Phase changes may be detected when the difference in branch counts of consecutive intervals exceeds a predetermined threshold.

Another example of a program phase may be the instruction working set of the program, or the set of instructions touched in a fixed interval of time. The use of subroutines may be used to identify program phases. If the time spent in a subroutine is greater than a predetermined threshold, then a phase change has been identified. The execution frequencies of basic blocks within a particular execution interval may define another phase change. The number of memory access operations, such as load and store instructions, within a subroutine, a basic block, or other program code segment may determine the time spent on execution of the program code segment. For example, load and store instructions may be held in a queue for a long time due to memory bus traffic, source operand dependencies, cache misses, insufficient resources such as a number of ports to memory, or other.

The number of memory access operations and the detection of memory-related program errors such as un-initialized memory usage and array out-of-bounds accesses may be determined to be a desirable measurement criterion for program profiling. This memory profiling may be achieved through program code instrumentation. The insertion of additional code, instrumentation code, may communicate to a profiling system properties of memory access operations such as an address, size of the access, program counter value if it is different from the specific address and multiple instruction or data blocks are fetched per clock cycle, or other.

In order to detect or identify memory access operations in order to track memory-related program errors during execution of a software application, the application program may be instrumented. Program instrumentation may comprise augmenting code with new code in order to collect runtime information. Generally speaking, to instrument code refers to the act of adding extra code to a program for the purpose of dynamic analysis. Also, the code added during instrumentation is referred to as the instrumentation code. It may also be referred to as analysis code.

The code that performs the instrumentation is not referred to as instrumentation code. Rather, this code resides in an instrumentation toolkit, which is further explained shortly. In one embodiment, the analysis code may be inserted entirely inline. In another embodiment, the analysis code may include external routines called from the inline analysis code. The analysis code is executed as part of the program's normal execution. However, the analysis code does not change the results of the program's execution, although the analysis code may increase the required execution time. For example, an application that has been instrumented may be slowed down by one or two orders of magnitude. An application that requires hours to execute alone, may require days or weeks to execute when instrumented. Therefore, straightforward instrumentation of every memory access operation may be highly undesirable as it negatively affects run-time performance of the application. A designer of a memory profiling system may wish to avoid unnecessary code instrumentation whenever possible.

Figure 2:
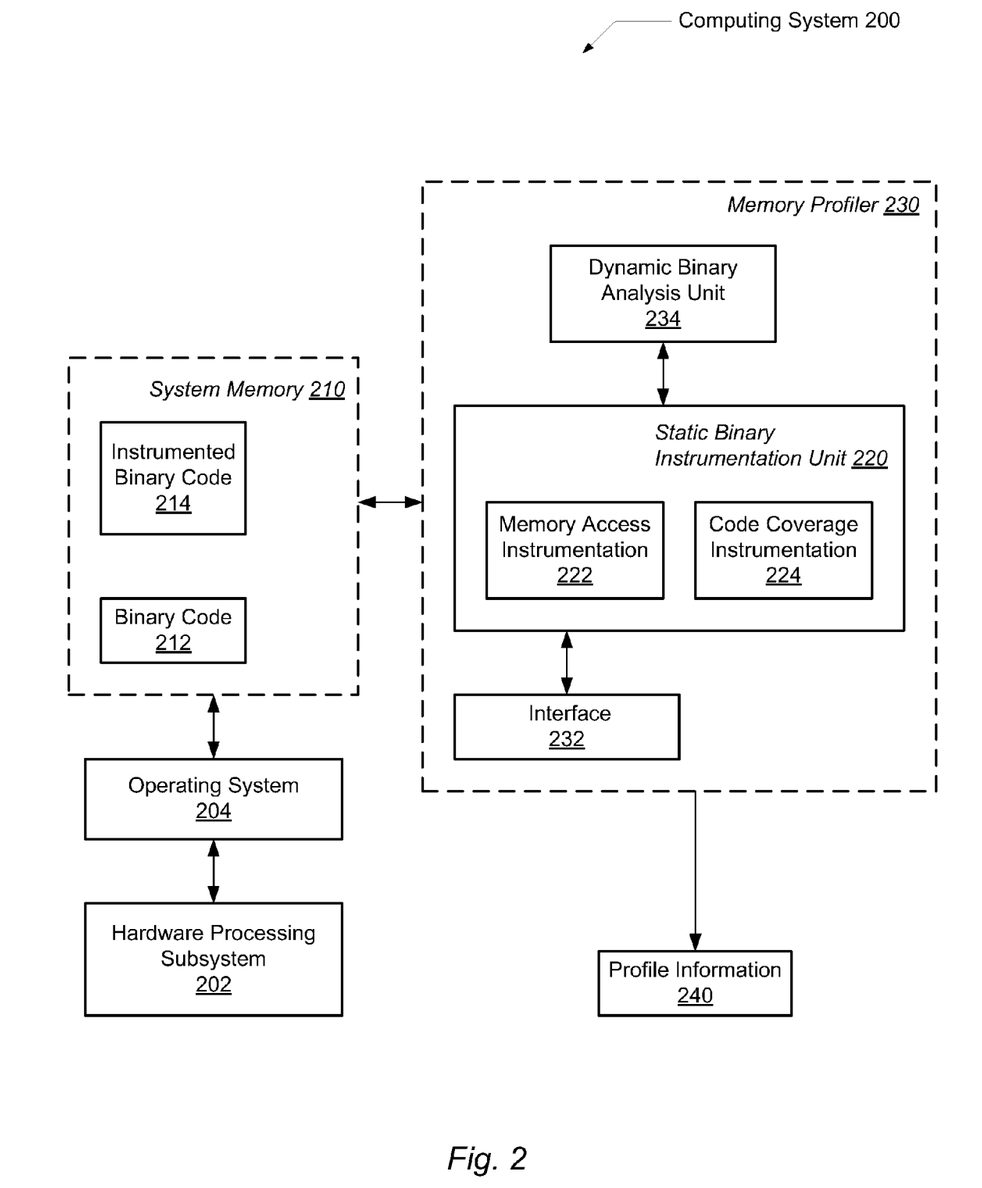
FIG. 2 is a generalized block diagram illustrating one embodiment of a computing system for efficient program instrumentation for memory profiling.

Turning now to FIG. 2, one embodiment of a computing system 200 including a Memory profiler 230 for efficient program instrumentation for memory profiling is shown. In one embodiment, hardware processing subsystem 202 may have one or more microprocessors that have the same circuitry as shown in FIG. 1. Operating system 204 manages the operation of the hardware in subsystem 202, which relieves application programs from having to manage details such as allocating regions of memory for a software application. The multiple processes of a compiled software application may require its own resources such as an image of memory, or an instance of instructions and data before application execution. Each process may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and the process' set of permissions.

In one embodiment, interface 232 may comprise application programming interfaces (APIs) for static binary instrumentation (SBI) unit 220. In another embodiment, interface 232 may simply read a configuration file generated by a user. Interface 232 may allow a user to determine what instrumentation routines and analysis routines may be augmented to binary code 212 by SBI tool 220. Binary code 212 may be stored in system memory 210. The augmented code output of SBI tool 220 may be stored as instrumented binary code 214 in system memory 210. Both binary code 212 and instrumented binary code 214 may also be stored in one or more levels of a cache subsystem within hardware processing subsystem 202.

Instrumentation routines define where instrumentation code is inserted such as before a predetermined instruction type. However, a condition may arise that may prevent such an instrumentation from occurring or that may alter the type of instrumentation and analysis routines inserted. Such identified conditions may reduce subsequent execution of instrumentation and analysis routines that may increase performance. Further details are provided later.

The binary instrumentation of code may be performed statically or dynamically. Performing complete data flow and control flow analyses to yield a data flow graph and a control flow graph, respectively, at execution time may require too much overhead for dynamic instrumentation. Static binary instrumentation (SBI) occurs prior to the execution of a program. The process of SBI rewrites object code or executable code such as binary code 212. These steps may be performed by SBI unit 220. SBI unit 220 may receive the executable binary code 212 as an input, adding the instrumentation code and analysis code to the binary code at desired locations, and generate new machine code such as instrumented binary code 214 to be loaded and executed.

The SBI unit 220 may require static compilation, wherein instrumentation libraries or tools insert analysis code. This insertion step may occur prior to linking or subsequent to linking within the back-end compilation stage. The new, augmented code 214 is then ready to be executed and provide statistics for performance studies or debugging techniques.

A user may write instrumentation and analysis routines, which may interface with SBI unit 220 via interface 232. The instrumentation may be customizable. The user decides where analysis calls are inserted, the arguments to the analysis routines, and what the analysis routines measure.

For example, an instrumentation toolkit such as SBI unit 220 may be instructed to insert code at memory access instructions if these instructions satisfy predetermined conditions. Further details are provided shortly. Then information may be collected regarding cache misses, memory errors, or other.

The SBI unit 220 sees every instruction in the user process that is executed, including any dynamic loader and all shared libraries. The instrumentation and analysis routines may execute in the same address space as the application, and can see all the application's data. The SBI unit 220 may pass instructions or a sequence of instructions (trace) to an instrumentation routine which may reside in tool 222. Tool 222 may not use the same memory stack or heap area as the application, and may maps addresses in a special area. Addresses of local variables (stack) and addresses returned by calls are not changed. Other embodiments of a SBI tool are possible and contemplated.

The SBI unit 220 may inspect and modify the binary code 212 with instrumentation and analysis code. In one embodiment, the SBI unit 220 may comprise only a memory access instrumentation tool 222. Tool 222 may be configured to determine which memory access operations to instrument and whether to alter any required instrumentation. Further details of its operation are provided shortly. In another embodiment, the SBI unit 220 may also comprise a code coverage instrumentation tool 224 configured to instrument binary code 212 for typical program profiling.

Analysis routines define the functionality of the instrumentation when the instrumentation is activated during program execution. A simple example is an increment counter. These routines may occur each time an instruction is executed. Alternatively, as will be explained later, these routines may be gated by a condition within an instrumentation instruction.

As the instrumented binary code 214 is executed, the SBI unit 220 may convey program characteristic information relayed by the analysis routines to the dynamic binary analysis (DBA) unit 234. The DBA unit 234 may utilize the characterization information to determine memory errors within the original binary code 212.

In one embodiment, the DBA unit 234 may compress the accumulative characterization information and any corresponding identification information either prior or subsequent to storing the information. Next, the DBA unit 234 may analyze the information and the results may be written to files and these files may be summarized by logfiles. These files and logfiles may combine to generate memory profile information 240, which may include other program profile information from tool 224 also. Profile information 240 may provide a memory profile of a software application described by binary code 212.

Figure 3:
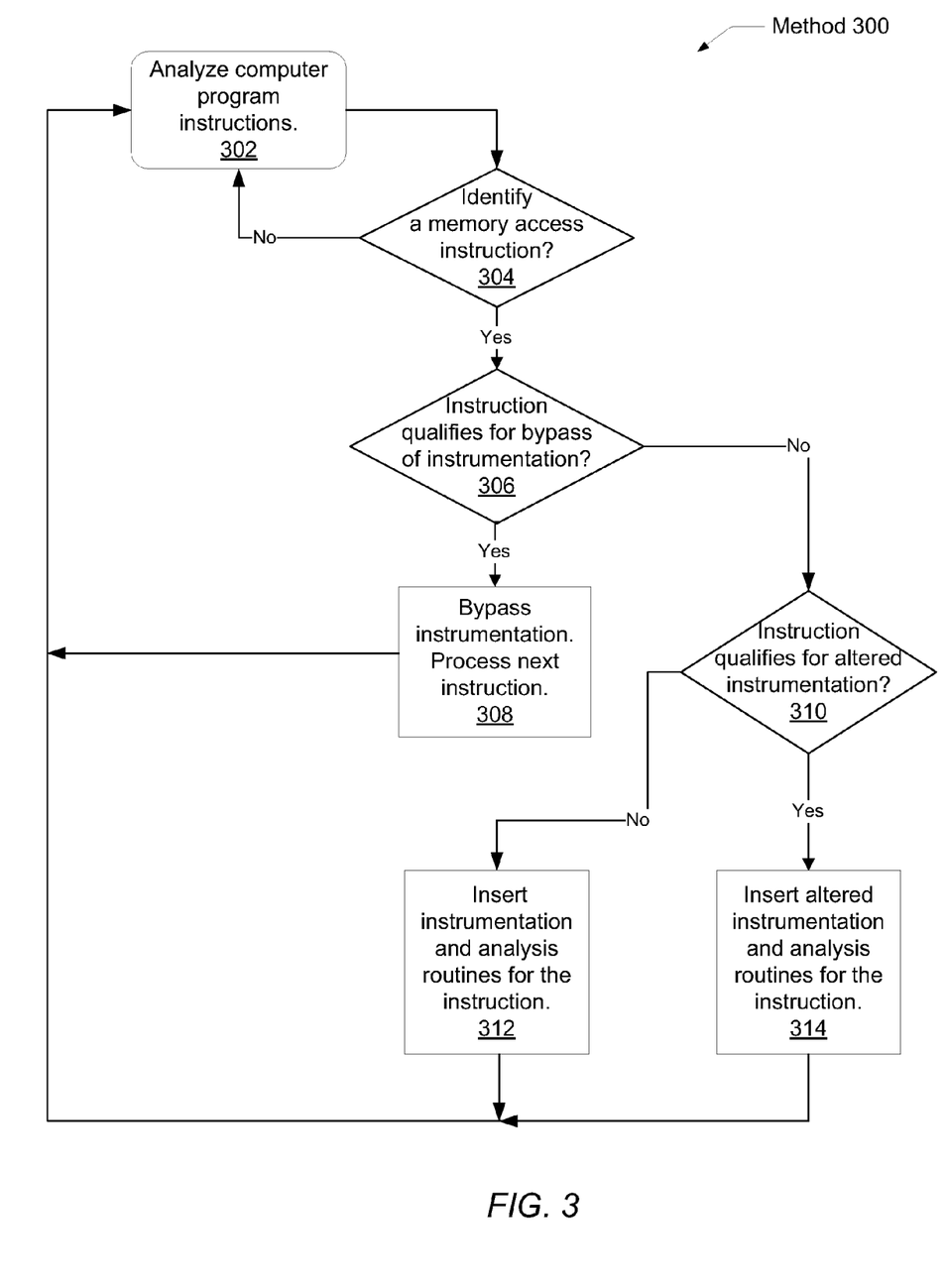
FIG. 3 is a flow diagram illustrating one embodiment of a method for efficient memory access instruction instrumentation.

Turning now to FIG. 3, one embodiment of a method 300 for efficient memory access instruction instrumentation is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 302, instructions of binary code, such as machine code, of a software application may be loaded and analyzed prior to program execution. In one embodiment, a static binary instrumentation (SBI) tool, such as SBI Unit 220, may analyze the binary code, such as binary code 212, prior to code execution.

If a memory access instruction, such as a load or a store operation, is identified (conditional block 304), then the instruction may be inspected in order to determine whether the instruction qualifies for no instrumentation (conditional block 306). By doing so, the amount of measuring and error-checking analysis performed in subsequent execution by analysis routines may be greatly reduced. Several conditions may be tested in order to determine whether the memory access instruction does not require instrumentation (conditional block 306). Some examples are provided below.

For example, sometimes the user may not be interested in gathering profiling data for a specific memory region. One example is not collecting profiling information from memory addresses belonging to a shared memory. The user may specify at an interface to an instrumentation tool a memory range (e.g. flag-ignore:0x50000-0x60000), wherein instrumentation code generation may be bypassed in block 308 whenever the operation is determined to correspond to an address within the specified addresses range. It may be possible for the instrumentation system or tool to statically determine an address of the memory access operation. If the tool is not able to perform this static determination, then the instruction does not qualify for this reason for bypass of instrumentation (conditional block 306).

In addition to a user-specified address range, instrumentation may be selective based on a user-specified memory type. An instrumentation tool may provide the user the option of choosing the type of memory to be instrumented. In one embodiment, a user flag may be utilized to instruct the instrumentation tool to instrument only stack memory. The use of a stack pointer may indicate where in the code to add instrumentation code. If a memory access operation does not utilize the stack memory or qualify for instrumentation by other means (conditional block 306), then augmentation of the program code with instrumentation code at this location may be bypassed in block 308.

Incremental development of program code may provide another example of a condition for bypassing instrumentation. A typical software development environment involves incremental changes to already existing code. This code may have been already thoroughly tested for problems including memory errors. The instrumentation of tested code may be bypassed in order that the testing focus may be on the incremental changes added to the code. For instance, each load instruction within previously tested code may qualify for instrumentation bypass (conditional block 306). In one embodiment, previously tested code may be identified to an instrumentation toolkit by the user via a code range, rather than an address range or memory type, such as providing a library name of a previously tested library. The store instructions may still need to be instrumented, but the analysis code may be reduced.

Although read operations may not need to be tested in previously tested code, the write operations, or store instructions, may need to be instrumented. However, the amount of subsequent analysis during execution may be reduced. Therefore, the amount and type of analysis routines may be altered from previous methods. Further details will be provided below regarding altered instrumentation.

Some load operations outside of previously tested code, also, may not require instrumentation. When it is possible for the instrumentation system or toolkit to statically determine an address of the load operation, and further determine, such as from a data flow graph output of a compiler, that the data at this determined address is a constant value, such as an instruction, a block of instructions, or other read-only area, then the instrumentation code for this particular load operation may be bypassed or skipped in block 308.

The use of compiler outputs, such as control flow graphs and data flow graphs, may be utilized to indicate locations in program code where memory access operations may qualify for bypass of instrumentation (conditional block 306). The use of static compile time data flow graphs may be used to detect initialized variables, which may eliminate a need for static instrumentation and subsequently performing run-time checking. For instance, within a same function or module, a load instruction may read data from a memory location indicated by a constant address value. This memory location may be initialized by a previous store instruction. However, this store and load instruction pair may not be in-line within the code. There may be one or more conditional and/or unconditional control flow transfer instructions between them. Static analysis of the control flow graph and data flow graph outputs of a compiler may illustrate that initialization, however, does occur (conditional block 306). Therefore, instrumentation of the load instruction may be bypassed in block 308.

A static memory processing optimization may cause bypass of instrumentation. Static memory, such as memory allocated by the program binary code, may be considered initialized at the start of program execution. However, it can later become un-initialized if the contents of un-initialized memory are copied to it during program execution. This event is uncommon, and may be registered by the instrumentation toolkit. If this event is not registered, the checking to static memory may be skipped, which may improve run-time. Furthermore, unless the event is registered, there may be no need to allocate "shadow" memory for the static region in order to track un-initialized data.

Yet another example of a possible instrumentation bypass is compiler-driven speculative loads. A compiler may inspect program code and find a load instruction located either immediately or shortly prior to an "if-then-elseif-else" statement. In response, the compiler may place a speculative load instruction, corresponding to this prior load instruction, to be executed on all paths of execution. However, a result of a speculative load instruction may only be used on a specific branch(es). In one example, a value of a local variable may be loaded prior to an "if-then-else" statement but this value may be used only in the "if" branch. An instrumentation toolkit may modify the compiler output and maintain the speculative load instruction only in the execution branch that uses its result, such as the "if" branch in the mentioned example. This load instruction may be instrumented if it does not satisfy conditions for instrumentation bypass such as the conditions mentioned above. The speculative load instructions in the branches that do not use its result may be removed. Performance of executing instrumented code may increase by avoiding unnecessary instrumentation code and eliminating associated false positives in a memory-error detection system. A false positive is a statistical error corresponding to observing a difference when in truth there is none. This error may be viewed as the error of excessive skepticism.

If a memory access instruction does not qualify for instrumentation bypass (conditional block 306), then the instruction may qualify for altered or reduced instrumentation (conditional block 310). For example, as described above, previously tested code may be identified to an instrumentation toolkit by the user via a code range such as providing a library name of a previously tested library. Although the load instructions within previously tested code may qualify for instrumentation bypass, the store instructions may still need to be instrumented. However, the analysis routine may be reduced from full checking. During the instrumentation stage, analysis routines may be placed in-line or reside in a function call, wherein the function name is placed in-line within the code either before or after the store instruction.

For these store instructions, analysis and error detection of these memory writes may be skipped. However, these store instructions are still instrumented in block 314 of method 300 in order that the data being written is recorded for later checking in the case of load instructions located in the incremental new code read this data. Analysis and error-checking may be performed on the memory write data by analysis code invoked by instrumentation code surrounding these new code load instructions.

In some cases, a memory access instruction may not qualify for instrumentation bypass, and subsequently, analysis code bypass at the instrumentation phase and later analysis execution. However, the instruction may qualify for bypass during program execution time. A check for a memory error by the instruction may only need to be performed once. The next time the instruction is executed, it may not need to be checked anymore. Therefore, an instrumented instruction may behave as a conditional branch instruction.

During the first execution of this instrumentation instruction, it may access a flag or value to determine whether the corresponding analysis code needs to be executed. For example, a load instruction may read a value that is initialized outside of the same function or module. Prior to execution, static analysis may not be able to determine that this value has been initialized since a linker may be required. Therefore, the instruction is instrumented, but a check only needs to occur once. During program execution, during the initial execution of this load instruction and its corresponding analysis code, the corresponding read value may be determined to be initialized. A flag or corresponding other value may be reset in a manner to indicate that a check is no longer required. During subsequent executions of the corresponding instrumented instruction, program control flow may skip the analysis code and continue with the subsequent instructions in program order. Therefore, performance may increase and calculating false positives may decrease.

The addition of a flag or other conditional value to be checked by the instrumented instruction comprises an altered instrumentation to be inserted in the program code in block 314. Another example of a check-only-once-altered instrumentation instruction may comprise un-initialized memory marking. Un-initialized memory may be marked internally by setting memory contents to a predetermined value (e.g. 0xDEDEDEDE). Later, when a particular instrumentation instruction for a load instruction is initially executed, a check for an un-initialized memory read may be performed. The read data content may be compared to the predetermined value. If a match is detected, then further processing by analysis code may be performed. Otherwise, the value may be considered initialized and a flag may be reset in a manner to indicate that a check is no longer required. During subsequent executions of the corresponding instrumented instruction, program control flow may skip the data comparison and analysis code and continue with the subsequent instructions in program order. Therefore, performance may increase and calculating false positives may decrease.

Partial use of a read cache line may also qualify a load instruction for an altered instrumentation (conditional block 310). For example, program code may load a value to be used comprising only a byte from a cache line comprising a word, or 4 bytes. Using data flow information, it may be possible for an instrumentation toolkit to detect such partial value usage and produce instrumentation code in block 314 of method 300 only for the used portion of the read data (i.e. the last byte). Besides improving performance, this technique may eliminate false positives in error-detection systems by providing the exact number of bytes used in program execution.

Another example of altering instrumentation and analysis routines in block 314 of method 300 is avoiding unnecessary context saves. A typical instrumentation tool may need to augment new instrumentation code around a memory access instruction in order to save or restore the context of user program code before transferring the control to an error detection library. This step may comprise saving volatile registers before the new function call. Using dataflow information, such as results from register liveness analysis, it may be possible to determine "dead" registers, which do not require saving and restoring.

Figure 4:
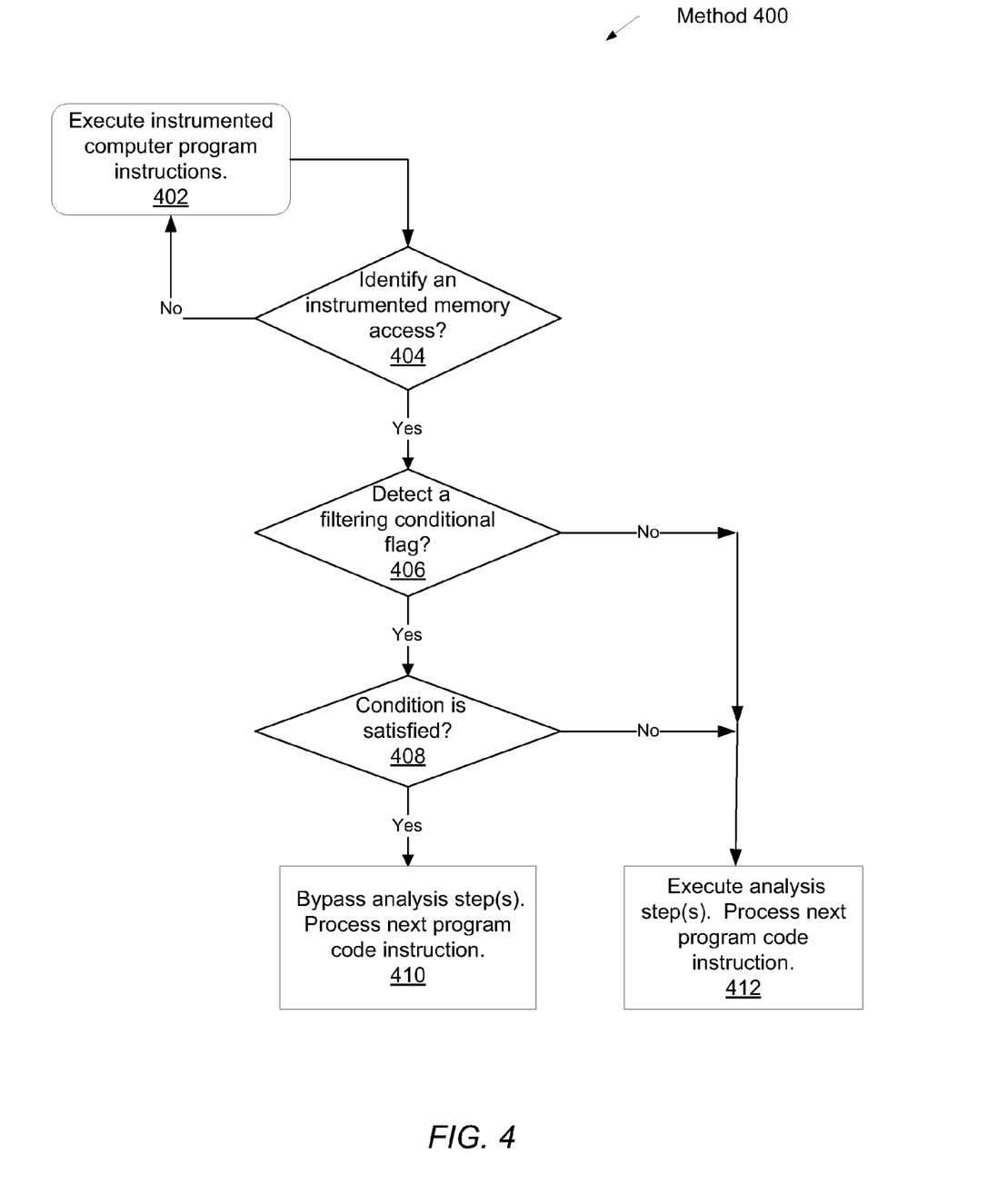
FIG. 4 is a flow diagram illustrating one embodiment of a method for efficient execution of memory access instrumentation.

If a memory access instruction does not qualify for altered instrumentation (conditional block 310), then the program code may be augmented with typical instrumentation and analysis code in block 312. Referring to FIG. 4, one embodiment of a method 400 for efficient execution of memory access instrumentation is shown. As with method 300, the steps in this embodiment and subsequent embodiments of methods described later are shown in sequential order. However, some steps may occur in a different order than shown, some steps may be performed concurrently, some steps may be combined with other steps, and some steps may be absent in another embodiment.

The augmented program binary code, such as code 214 in FIG. 2, may be stored on a computer readable medium. A command instruction, which may be entered at a prompt by a user or executed by a script, with any necessary options may be executed in order to execute the augmented binary code in block 402. When instrumentation code for a memory access instruction is identified or detected (conditional block 404), then a filtering conditional flag may be detected within an instrumentation instruction (conditional block 406). As described above, such a conditional flag may be used when it is unknown prior to program execution whether a load instruction reads an initialized value. If the condition is satisfied (conditional block 408), or, for example, it has been determined during program execution that a load instruction does read an initialized value, then a subsequent analysis routine may be skipped and execution can proceed with the next sequential program code instruction in program order in block 410. Otherwise, the corresponding analysis routine is executed in block 412.

It is further noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A compilation method for memory profiling, the method comprising:

analyzing source program code of a computer program;

identifying memory access instructions in the source program code of the computer program; and determining a first memory access instruction qualifies for instrumentation;

wherein the instrumentation comprises:

inserting additional program instructions into the computer program;

wherein the additional program instructions:

invoke a memory check operation only during a first execution of the first memory access instruction, wherein the memory check operation stores an identifier and statistics of the first memory access instruction for profiling; and bypass a memory check operation during subsequent executions of the first memory access instruction, in response to determining that a read data value of the first memory access instruction was initialized during the first execution.

2. The method as recited in claim 1, further comprising determining a second memory access instruction qualifies for bypass of instrumentation.

3. The method as recited in claim 2, wherein determining the second memory access instruction qualifies for bypass of instrumentation comprises one or more of the following: the second memory access instruction accesses an address within a user-specified address range and the second memory access instruction accesses a memory type not within a user-specified memory type.

4. The method as recited in claim 3, wherein determining the second memory access instruction qualifies for bypass of instrumentation further comprises one or more of the following: the second memory access instruction is a load instruction within a user-specified code range and the second memory access instruction is a load instruction accessing a memory location determined from a data flow graph to store an initialized value.

5. The method as recited in claim 1, further comprising removing a speculative load instruction from a branch of execution in the program code, wherein it is determined the speculative load instruction reads a value that is not used in the branch of execution.

6. The method as recited in claim 1, further comprising instrumenting only a portion of a memory location data value corresponding to a memory access instruction, in response to determining only said portion of the memory location data value is used by the program.

7. The method as recited in claim 1, further comprising instrumenting a store instruction with no analysis checks in response to the store instruction is within a user-specified code range.

8. The method as recited in claim 1, wherein determining the read data value of the first memory instruction is initialized comprises one or more of the following: inspecting variables subsequent utilizing a linker for separate modules and comparing the read data value to a predetermined marker value, wherein the marker value is written to un-initialized memory prior to program execution.

9. A computing system comprising:
one or more processors each comprising one or more processor cores;
a memory coupled to the one or more processors, wherein the memory stores a program comprising program code;
wherein a processor of the one or more processors is configured to execute program instructions of a compiler which when executed are operable to:
analyze source program code of a computer program;
identify memory access instructions in the source program code of the computer program; and
determine a first memory access instruction qualifies for instrumentation;
wherein the instrumentation comprises inserting additional program instructions into the computer program, wherein the additional program instructions:
invoke a memory check operation only during a first execution of the first memory access instruction, wherein the memory check operation stores an identifier and statistics of the first memory access instruction for profiling; and bypass a memory check operation during subsequent executions of the first memory access instruction, in response to determining during the first execution that a read data value of the first memory access instruction was initialized.

10. The computing system as recited in claim 9, wherein the processor of the one or more processors is configured to execute program instructions which when executed are further operable to determine a second memory access instruction qualifies for bypass of instrumentation.

11. The computing system as recited in claim 10, wherein determining the second memory access instruction qualifies for bypass of instrumentation comprises one or more of the following: the second memory access instruction accesses an address within a user-specified address range and the second memory access instruction accesses a memory type not within a user-specified memory type.

12. The computing system as recited in claim 11, wherein determining the second memory access instruction qualifies for bypass of instrumentation further comprises one or more of the following: the second memory access instruction is a load instruction within a user-specified code range and the second memory access instruction is a load instruction accessing a memory location determined from a data flow graph to store an initialized value.

13. The computing system as recited in claim 9, wherein a processor of the one or more processors is configured to execute program instructions which when executed is operable to remove a speculative load instruction from a branch of execution in the program code, wherein it is determined the speculative load instruction reads a value that is not used in the branch of execution.

14. The computing system as recited in claim 9, wherein a processor of the one or more processors is configured to execute program instructions which when executed is operable to instrument only a portion of a memory location data value corresponding to a memory access instruction, in response to determining only said portion of the memory location data value is used by the program.

15. The computing system as recited in claim 9, wherein a processor of the one or more processors is configured to instrument a store instruction with no analysis checks in response to the store instruction is within a user-specified code range.

16. The computing system as recited in claim 9, wherein determining the read data value of the first memory instruction is initialized comprises one or more of the following: inspecting variables subsequent utilizing a linker for separate modules and comparing the read data value to a predetermined marker value, wherein the marker value is written to un-initialized memory prior to program execution.

17. A non-transitory computer readable storage medium storing program instructions, wherein the program instructions are executable to:
analyze source program code of a computer program;
identify memory access instructions in the source program code of the computer program; and
determine a first memory access instruction qualifies for instrumentation;
wherein the instrumentation comprises inserting additional program instructions into the computer program, wherein the additional program instructions:
invoke a memory check operation only during a first execution of the first memory access instruction, wherein the memory check operation stores an identifier and statistics of the first memory access instruction for profiling; and bypass a memory check operation during subsequent executions of the first memory access instruction, in response to determining during the first execution that a read data value of the first memory access instruction was initialized.

18. The storage medium as recited in claim 17, wherein the program instructions are further executable to determine a second memory access instruction qualifies for bypass of instrumentation.

19. The storage medium as recited in claim 18, wherein determining the second memory access instruction qualifies for bypass of instrumentation comprises one or more of the following: the second memory access instruction accesses an address within a user-specified address range and the second memory access instruction accesses a memory type not within a user-specified memory type.

20. The storage medium as recited in claim 17, wherein determining the read data value of the first memory instruction is initialized comprises one or more of the following: inspecting variables subsequent utilizing a linker for separate modules and comparing the read data value to a predetermined marker value, wherein the marker value is written to un-initialized memory prior to program execution.

* * * * *